Patented Nov. 20, 1934

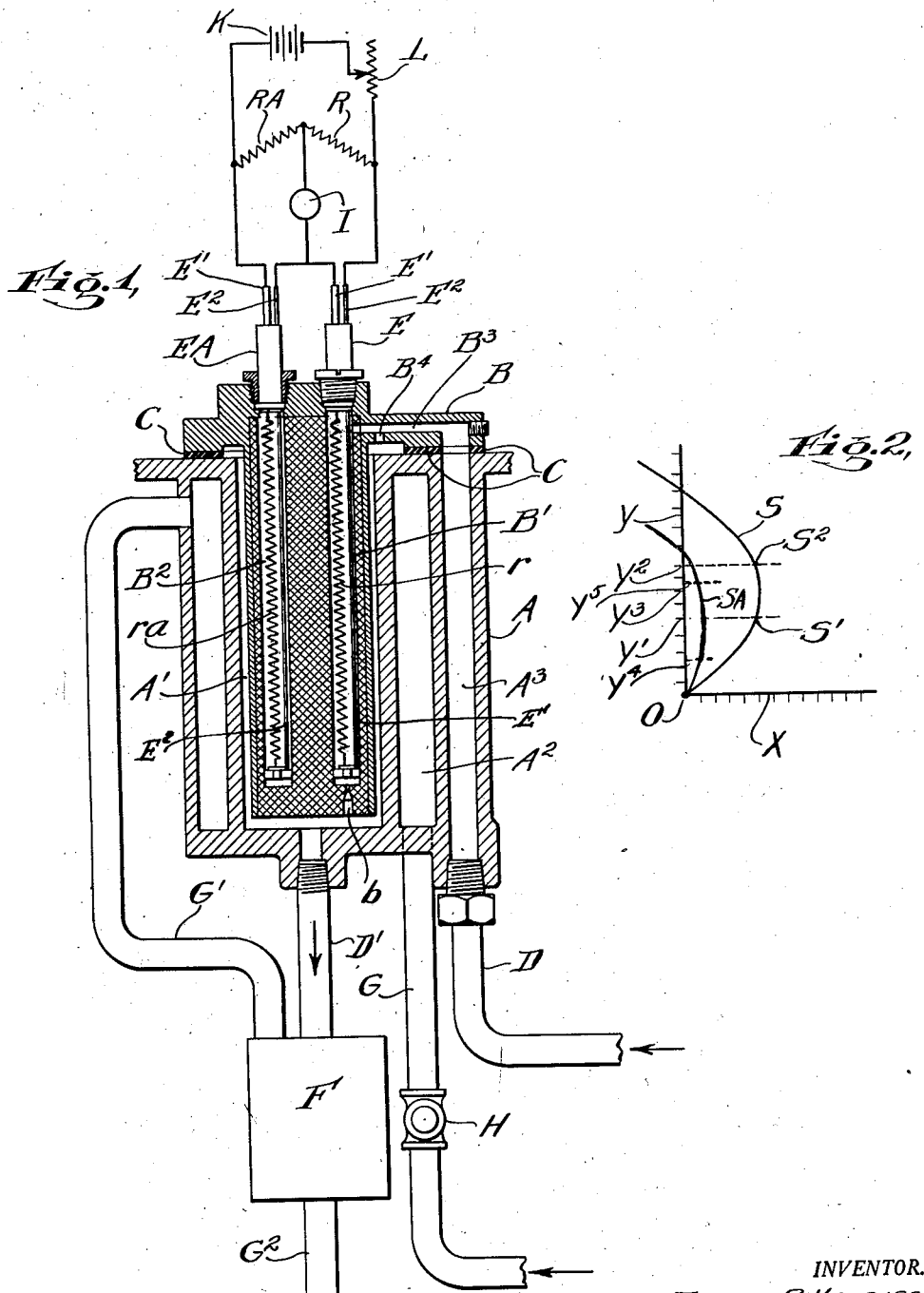

1,981,172

UNITED STATES PATENT OFFICE 1,981,172

METHOD OF MEASURING THERMAL CONDUCTIVITY

Thomas R. Harrison, Philadelphia, Pa., assignor to The Brown Instrument Company, Philadelphia, Pa., a corporation of Pennsylvania Application February 15, 1927, Serial No. 168,446

4 Claims. (Cl. 73—51)

The general object of the present invention is to provide an improved method of determining the thermal conductivity of a fluid, and particularly of a gas, from the changes in resistance resulting from variations in the temperature of an electrical resistance or resistor element heated by an electric current flowing through the resistor, and cooled by said fluid which conducts heat from the resistor to the wall of a cell containing said resistor and filled by said fluid. Apparatus of the character described is now in extensive use for determining the composition of gases such as furnace gases, since different gases, as for example carbon dioxide and the other constituents of furnace gases, have different thermal conductivities. In consequence, the rate at which a resistor used as described is cooled by gas within the resistor containing cell depends upon the composition of the gas insofar as the composition of the gas determines the thermal conductivity of the gas.

For gas analysis apparatus, to avoid lag and to insure prompt and definite indications of changes in the composition of the gas passing through the cell, it is in general desirable that the gas flow through the latter should be relatively rapid. In practice, however, I have found that the temperature attained by the resistor delocated in a cell through which gas is flowing depends not only upon the composition of the gas, but also upon the rate of flow of the gas. In normal operation, the gas within the cell is necessarily at a temperature lower than that of the resistor, and the resistor cooling effect is therefore dependent not only upon the conduction of heat by the gas from the resistor to the cell wall, but also on the amount of heat absorbed by the gas, and raising the temperature of the latter, which is carried out of the cell by the gas leaving the latter. The amount of heat so absorbed and carried out of the cell by the gas, obviously increases with the rate of gas flow through the cell. The difference between the temperatures at which the gas enters and leaves the cell tends to diminish, and the average gas temperature in the cell tends to decrease as the rate of gas flow through the cell is increased. I have found, also, that in practical gas analysis apparatus, a convection circulation of the gas within the cell normally occurs and that this of itself also tends to materially modify the temperature attained by the resistor under some conditions.

I have also discovered that in suitably constructed thermal conductivity apparatus it is practically possible by keeping the rate of gas flow through the cell between limits separated by a considerable range to cause the effect of a change in the actual rate of gas flow through the cell to neutralize, or compensate for the resultant changes in the convection current circulation within the cell, so far as said changes in rate of gas flow and convection current circulation tend of themselves to alter the temperature of the resistor. In consequence, if the gas velocity through the cell is kept within such range, the accuracy of the measurements obtained are not materially dependent upon the actual rate of gas flow through the cell.

I have discovered further that the advantageous result of the neutralization or compensation just referred to, may be advantageously supplemented by causing the stream of gas entering the cell to initially impinge upon the upper portion of the resistor and thereby subjecting said resistor portion to an intensive local cooling effect.

My invention may be carried out in various ways, and may be utilized in connection with thermal conductivity apparatus of various types, and it is to be understood that the particular form of gas analysis apparatus illustrated in the accompanying drawing and not to be described is illustrated by way of example, and that the specific form of this apparatus is not an essential feature of the present invention.

The various features of novelty which characterize my invention are pointed out with particularity in the claims annexed to and forming a part of this specification. For a better understanding of the invention, its objects and advantages attained with its use, reference should be had to the accompanying drawing and descriptive matter in which I have illustrated and described a preferred mode of practicing the invention.

Of the drawing:

Fig. 1 is a diagrammatic representation of one form of gas analysis apparatus with which the invention may be advantageously carried out; and Fig. 2 is a chart diagrammatically illustrating a principle of the invention.

The gas analysis apparatus illustrated by way of example in Fig. 1, comprises a housing formed of a chambered metallic body member A and a separable member B. As shown, the member A is formed with a cell block receiving chamber or cavity A' closed at its lower end and open at its upper end, and is formed with a cooling water jacket space $A^2$ surrounding the cavity $A'$. The member B comprises a cell block or body portion extending into the chamber $A'$ and a flange portion abutting against the upper end of the body portion A at the outer side of the cavity $A'$. A vertically disposed test gas cell $B'$ is formed in cell block portion of the member B. As shown, the cell $B'$ communicates at its lower end through a restricted port $b$ with the chamber $A'$ and communicates adjacent its upper end with a channel $B^3$ through which the test gas enters the cell $B'$ from a gas channel $A^3$ formed in the body A.

Test gas is supplied to the lower end of the channel $A^3$ through a pipe D leading from a furnace chamber or other source of gas to be analyzed. The gas thus entering the apparatus through the pipe D is withdrawn through the pipe $D'$ leading from the bottom of the chamber $A'$ and connected, as shown, to an aspirating device or ejector F. The motive fluid for the aspirator F, as shown, is cooling water supplied to the chamber $A^2$ through a pipe G, and escaping from the chamber $A^2$ through a pipe $G'$ leading to the motive fluid inlet of the aspirator F. $G^2$ represents the waste pipe connection from the aspirator F through which the motive fluid and the gas drawn out of the chamber $A'$ through the pipe $D'$ are discharged to waste.

Mounted within the cell $B'$ is a resistor or resistance element $r$, which, as shown, is in the form of a helix having one end connected to a terminal $E'$ mounted in an insulating block E which closes the otherwise open upper end of the cell $B'$. The lower terminal of the resistor $r$ is connected to a rod-like extension of a second terminal member $E^2$ mounted in the block E. In general, gas analysis apparatus of the character described, comprises means for determining the changes in resistance value of the resistor $r$ not by direct measurement but by comparison with the changes in the resistance value of a similar resistor mounted in a similar cell and cooled by a standard gas or gas of known thermal conductivity. In Fig. 1, I have shown a comparison resistor $ra$ located within a second cell $B^2$ formed in the member B. The resistor $ra$ is supported by terminals $E'$ and $E^2$ mounted in a block EA closing the upper end of the cell $B^2$. The cell $B^2$ and its contents are similar to the cell $B'$ and the contents of the latter, except that the cell $B^2$ is shown as closed and is intended to be filled by the standard gas or gas of known thermal conductivity.

To insure more effective temperature equalization and regulation, a portion of the gas supplied through the pipe D, is permitted to enter the chamber or cavity $A'$ at the upper end of the latter through a port $B^4$ formed in the wall of the channel $B^3$. C represents gasket material interposed between the parts A and B.

In the simple and conventional mode of utilizing the resistors $r$ and $ra$ for gas analysis illustrated in Fig. 1, those resistors form two legs or arms of a Wheatstone bridge, in which the balancing resistors R and RA form the other two arms. As shown, the bridge is energized by a current including a source of current K and a regulating resistance L which is connected to opposing junction points of a bridge, and I represents a galvanometer or the like sensitive instrument connected between the other two junction points of the bridge.

The above described apparatus shown in Fig. 1 of itself constitutes no part of the present invention, but, on the contrary, is simply one example of apparatus which may be used in carrying out the present invention. While the apparatus shown in Fig. 1 itself forms no part of the present invention, it does embrace novel features of construction and arrangement which are disclosed and claimed in my prior applications Serial Nos. 68,650, filed November 12, 1925, and 130,216, filed August 19, 1926.

In the use of the apparatus shown in Fig. 1, I have found that with a relatively low rate of gas flow through the cell $B'$, the heating effect of the current flow through the resistor $r$ tends to create a convection current circulation of the cell atmosphere of relatively hot gas moving upward in close proximity in the resistor $r$ with a return flow of gas downward along the cell wall. In the particular apparatus illustrated, when the flow of gas into the apparatus through the pipe D is at quite a low rate, the convection current circulation may also involve some flow upward through the cell $B'$ and out through the channel $B^3$ with a return flow downward through the chamber $A'$, and thence into the lower end of the cell $B'$ through the port $b$. The net result of this convection current circulation is to make the temperature of the upper end of the resistor $r$ higher than that of the lower end of the resistor. Any increase in the rate of gas flow through the gas cell $B'$ from the inlet passage $B^3$ to the outlet $b$ tends to reduce the convection current circulation previously described, and thereby tends to a higher gas temperature in the lower end of the cell, and through a considerable range of gas flow, the resistor temperature-increasing effect due to the reduction in convection current circulation, tends to an increased temperature of the resistor $r$, and consequently to greater deflections of the pointer of the instrument I. Eventually, as the rate of gas flow into and out of the cell is increased, the cooling effect which results from the heat absorption by the gas passing through the cell becomes the controlling factor, and the temperature of the resistor $r$ and the deflection of the instrument I then begin to diminish.

I have found, however, and the utility of the invention depends in large part on this, that as the rate of gas flow through the cell is progressively increased from a certain low limit to a certain high limit, the cooling effect of the increased gas flow substantially neutralizes the increased resistor heating effect following the corresponding reduction in convection current circulation. This is illustrated by the chart of Fig. 2, wherein S is a curve representing the changes in the extent of the deflection of the pointer of the instrument I which occurs with changes in the rate of flow of a test gas of some one composition through the cell $B'$. In Fig. 2 the abscissæ measured along the line OX represent the meter deflections, and the ordinates measured along the line OY represent the rate of test gas flow through the cell $B'$. As the test gas flow increases from zero to the value indicated by the ordinate $OY'$, the meter deflection increases, and as the gas flow increases beyond a certain higher value indicated by the ordinate $OY^2$, the meter deflections decrease. Between the range in rate of gas flow represented by the ordinates $OY'$, and $OY^2$, the curve S does not vary much from a straight line parallel to the line OY, and if the gas flow is kept between the value represented by $OY'$ and $OY^2$, changes in the rate of test gas flow do not appreciably effect the extent of deflection of the instrument I.

In the preferred mode of utilizing this principle, I adjust the apparatus so that the rate of test gas flow is normally at some value represented by OY³ intermediate the values represented by OY' and OY². In practice I have found that the range in the rate of gas flow represented by the difference between the quantities OY' and OY² is substantial. In practice, the rate of gas flow through the cell may be regulated in any one of various ways. In the apparatus shown in Fig. 1, the desired regulating effect is obtained by the adjustment of a valve H in the cooling water supply pipe G, whereby the aspirating effect of the aspirator F is regulated, but obviously other means may be employed for determining what may be called the normal or average rate of gas flow through the cell B'.

By arranging the resistor $r$ relative to gas channel B³ as shown, so that the stream of gas entering the cell B' impinges directly upon the upper portion of the resistor $r$ a further practical important advantage may be obtained. For example, if the curve S in Fig. 2 be assumed to illustrate the resistor temperature changes occurring with the cell constructed and operated to cause the effect of changes in the rate of gas flow through the cell to be substantially neutralized or compensated for by the resultant changes in convection current circulation, so far as the resistor temperature is concerned, when the entering stream of gas does not impinge directly against the upper end of the resistor $r$, with such impingement the actual resistor temperature for the same gas may be represented by the much flatter curve SA.

I believe that the advantageous effect on direct gas impingement of the upper end of the resistor $r$ may be correctly explained as follows:—The gas discharged from the channel B³ directly against the upper portion of the resistor $r$ subjects that resistor portion to a rather intense local cooling effect which increases as the rate of gas flow increases, until at some gas flow rate represented for example, by the ordinate OY', the temperature of the portion of the resistor against which the gas impinges becomes approximately equal to the temperature of the gas. For higher rates of gas flow there will then be no further increase in local cooling. The effect of the local cooling due to the impingement of the entering gas on the upper end of the resistor is effective and reaches its maximum with a range of gas flow wholly or largely below the range of flow represented by the difference between the ordinates OY' and OY². In consequence, the joint effect of the local cooling action of the gas impinging directly against the upper end of the resistor, and of neutralizing the result of the changes in the convection current circulation occurring as the rate of gas flow increases, is to make the curve S desirably flat between a rate of gas flow represented by the ordinate OY⁵ but little less than that represented by the ordinate OY², and a lesser rate of gas flow represented by the ordinate OY⁴ which is substantially shorter than the ordinate OY'. The relatively flat portion of the curve SA is considerably longer than the relatively flat portion of the curve S, and in practice the ordinates OY⁴ and OY⁵ may represent rates of gas flow of something like 50% and 150%, respectively, of a rate of gas flow which may be regarded as corresponding to the normal load on the apparatus. A further advantage of bringing the flattened portion of the resistor temperature curve SA close to the axis OY, is that throughout the operating range, the resistor temperature differs but little from the temperature with a zero rate of gas flow through the cell.

While, as already indicated, there is an especial advantage in the conjoint use of both of the described modes for regulating and controlling changes in resistor temperatures produced by changes in rate of gas flow through the cell, it will be apparent to those skilled in the art that either mode and particularly the one first described will give advantageous results when used alone.

Having now described my invention, what I claim as new and desire to secure by Letters Patent, is:—

1. In determining the thermal conductivity of a gas by measuring the resistance of a current carrying resistor in a cell containing said gas, the method which consists in passing the gas through said cell at a rate not widely different from that which is just sufficient to neutralize the resistor cooling effect of the convection circulation occurring when no gas is passed through the cell.

2. In determining the thermal conductivity of a gas by measuring the resistance of a current carrying vertically disposed resistor in a cell containing said gas, the method which consists in passing the gas downwardly through said cell at a rate sufficiently high to substantially minimize the tendency of the convection current circulation of the cell atmosphere to make the temperature of the resistor lower than it would be without such circulation and at a rate sufficiently low to avoid an appreciable reduction in resistor temperature as a result of the carrying of heat out of the cell by the gas passing through and out of the latter.

3. In determining the thermal conductivity of a gas by measuring the resistance of a current carrying resistor in a cell containing said gas, the method which consists in passing the gas through said cell at a rate large enough to substantially neutralize the resistor cooling effect of the convection circulation occurring when no gas is passed through the cell and small enough to avoid a corresponding cooling effect due to the loss of heat carried out of the cell by the gas passing through the latter.

4. The method of regulating the operation of gas analysis apparatus of the thermal conductivity type which consists in maintaining a velocity of gas flow through a cell in which a current carrying resistor is located, large enough to substantially neutralize the resistor cooling effect of convection circulation and small enough to avoid an appreciable reduction in resistor temperature in consequence of the loss of heat carried out of the cell by the gas.

THOMAS R. HARRISON.